United States Patent
Lundstrom et al.

(10) Patent No.: US 6,644,602 B1
(45) Date of Patent: Nov. 11, 2003

(54) FLEXIBLE LINE GUIDE FOR INDUSTRIAL ROBOT

(75) Inventors: Christer Lundstrom, Enkoping (SE); Gunnar Thiede, Vasteras (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/807,537

(22) PCT Filed: Oct. 14, 1999

(86) PCT No.: PCT/SE99/01855

§ 371 (c)(1),
(2), (4) Date: May 31, 2001

(87) PCT Pub. No.: WO00/25990

PCT Pub. Date: May 11, 2000

(30) Foreign Application Priority Data

Oct. 16, 1998 (SE) .............................................. 9803547

(51) Int. Cl.⁷ ................................................. F16L 3/00
(52) U.S. Cl. ............................. 248/51; 248/49; 414/918
(58) Field of Search ............................. 248/49, 51, 52, 248/68.1, 65; 414/744.2, 918, 680, 735; 74/490.02; 901/50, 42, 15, 28, 21, 22; 235/375; 254/134.7, 1

(56) References Cited

U.S. PATENT DOCUMENTS

| | | | | |
|---|---|---|---|---|
| 3,075,732 A | * | 1/1963 | Lindenmeyer | 248/49 |
| 4,288,292 A | * | 9/1981 | Hardin, Jr. | 176/87 |
| 4,427,170 A | | 1/1984 | Truninger | 248/51 |
| 4,693,663 A | | 9/1987 | Brenholt et al. | 414/735 |
| 4,712,972 A | | 12/1987 | Nakashima et al. | 414/744 R |
| 4,807,432 A | * | 2/1989 | Mauri | 59/78.1 |
| 4,890,713 A | | 1/1990 | Pagano | 192/142 R |
| 4,906,121 A | * | 3/1990 | Torii et al. | 403/78 |
| 4,955,250 A | | 9/1990 | Fisher | 74/479 |
| 4,969,795 A | * | 11/1990 | Toyoda et al. | 414/744.2 |
| 5,694,813 A | | 12/1997 | McLaughlan | 74/490.02 |
| 5,792,992 A | * | 8/1998 | Handler | 174/101 |
| 6,138,961 A | * | 10/2000 | Zweig | 248/68.1 |

* cited by examiner

Primary Examiner—Gwendolyn Baxter
(74) Attorney, Agent, or Firm—Dykema Gossett PLLC

(57) ABSTRACT

Guide (20) for a loop of a flexible line (40) between a pair of rotatable parts (12, 14) of an industrial robot (10) that rotate relative to one another around an axis (18), whereby the loop includes a pair of strands (42, 44) of the line joined by a bend (46) that extend around axis (18) with their outsides engaged with the respective parts so that the loop is caused to perform a movement around the axis (18) when the parts rotate relative to one another. To reduce wear on the cover of the line and to facilitate replacing the line, it is suggested that, among other things, the engagement consists of a separate groove (22, 32) arranged for each strand (42 respectively 44).

13 Claims, 4 Drawing Sheets

FLEXIBLE LINE GUIDE FOR INDUSTRIAL ROBOT

TECHNICAL FIELD

The invention relates to a flexible line guide for an industrial robot according to the introduction to claim 1.

Such guides are commonly used for carrying an outer line in the form of a welding cable or a pressurised fluid line, for example, between the foot and the rotating upper section of an industrial robot.

PRIOR ART

Guides of this type are known, for example, from U.S. Pat. No. 5,694,813 and EP-A-0 552 688. A disadvantage of such known guides is that the outer peripheral side of the loop, especially at the bend, must be guided by the inside of a stationary cylindrical wall or a cylindrical wall that rotates together upper section of the robot, in order not to deviate outwards from the path of movement around the axis, which causes undesirable friction and wear on the covering of the line.

SUMMARY OF THE INVENTION

One objective of the present invention is to achieve a guide of the type stated in the introduction that significantly reduces wear and thus increases the working life of the covering of the line.

A second objective is to obtain a guide that makes it easy to replace the line.

These are achieved by means of the features that are stated in the following claims.

According to an aspect of the invention, a separate groove for every strand is the only engagement provided between the cable loop and the parts that rotate relative to one another. In this way, none of the strands nor the bend come into sliding contact with a wall, as is the case in the prior art, so that essentially all the relative movement between the covering of the line and the parts that rotate relative to one another that causes wear is eliminated. A further advantage with this arrangement is that thanks to the resulting free space between the grooves, the line is easier to remove from the guide and be put back there when it needs to be replaced.

According to one preferred embodiment of the invention, the grooves have different mutual radii so that the bend will be angled relative to the common axis of rotation. In this way, the radius of curvature of the bend can also be increased advantageously at a pre-determined axial distance between the grooves. This ensures partly that the insignificant relative movement that does nevertheless occur between the line and the groove takes place primarily only at the transition between the strand and the bend of the groove with the smaller radius and partly that the bend has less of a tendency to deviate at a tangent outwards from the path of rotation since it leans inwards from the largest radius.

If the grooves are formed in groove elements that can be mounted on the outsides of the respective parts in a removable fashion, an existing robot can later easily have an additional guide fitted according to the invention.

Other features and advantages of the invention are evident from the claims and the following detailed description.

DESCRIPTION OF THE DRAWINGS

Embodiments of the invention is described by way of example in detail below with reference to the enclosed drawings, where.

DETAILED DESCRIPTION OF EMBODIMENTS

Figure 1:
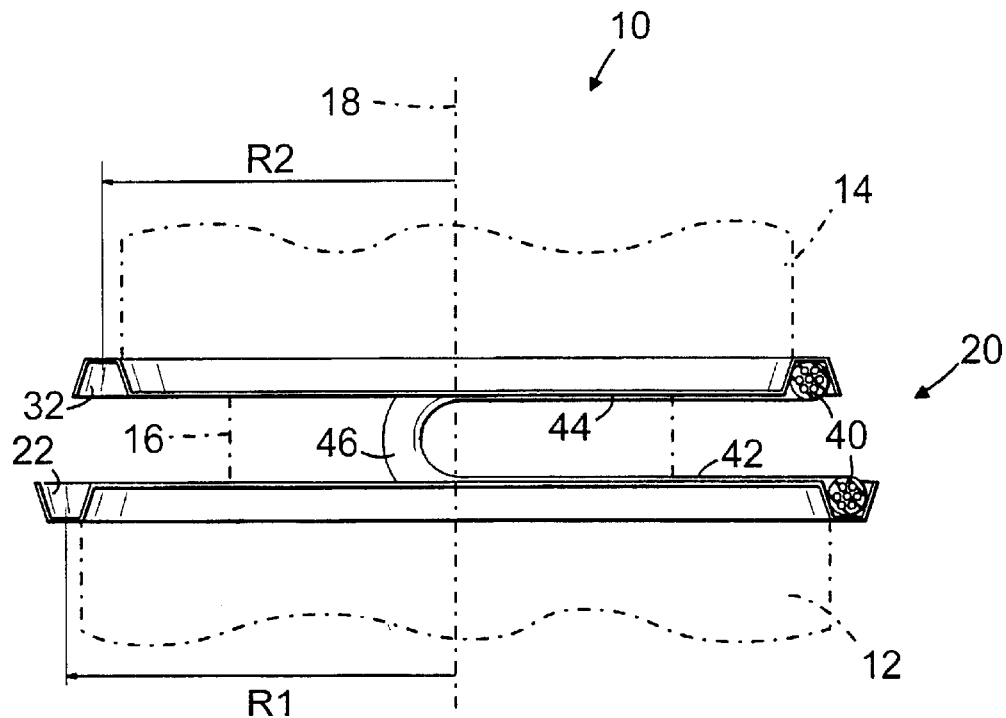
FIG. 1 is a diagrammatic view from behind of an industrial robot with some parts removed fitted with a guide according to the invention.

In the diagrammatic representation according to FIG. 1, an industrial robot is generally designated 10 and includes a lower section 12 in the form of a stationary foot and a rotating upper section 14 in the form of a frame unit that rotates relative to the foot around a vertical axis 18. The lower section 12 and the upper section 14 are joined with one another via a bearing arrangement 16 that is not shown in any greater detail.

A flexible, continuous line 40 with a covering that is not shown in detail extends between the lower section 12 and the upper section 14. This covering can typically enclose a welding cable, but also other types of lines for, for example, transport of fluids or other media. The covering can also be a separate outer covering for that part of the line that extends between parts 12 and 14 (not shown). In order for the upper part 14 to rotate without hinder for approximately 180° clock-wise and 180° counter-clockwise from the mid-point of rotation in FIG. 1, a slack of the line 40 to accommodate the movement of rotation extends in a loop round about 90° of the space between parts 12 and 14. More specifically, the loop has a lower partly circular strand 42, an upper partly circular strand 44 and a bend or nose 46 of line 40 that joins the strands. When the upper part 14 rotates counter-clockwise, the upper strand 44 is transferred to the lower strand 42 via the bend 46 "rolling forwards". When part 14 rotates clockwise, the lower strand 42 is transferred to the upper strand 44 in the reversed manner via the bend 46 "rolling backwards"

According to the invention, strands 42, 44 are guided by their engagement with their own groove 22 and 32 respectively. In the examples of the embodiments shown, grooves 22, 32 both extend in a circular arch around a front of the robot 10 when this is positioned in the middle of its field of rotation.

According to the invention, grooves 22 and 32 have different radii R1 and R2 respectively with regard to their common axis 18. The lower groove has the larger radius in the example shown, but the opposite case is also possible. It is also possible to have grooves with different radii in the same radial plane with regard to axis 18, so that the parts of the loops and the bend run in a common horizontal plane around the robot (not shown).

Figure 2:
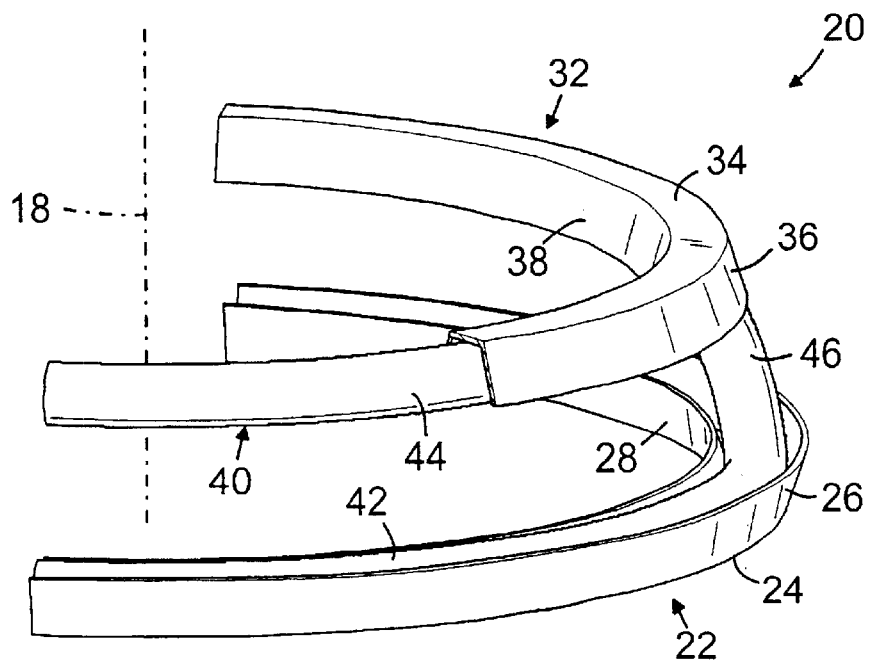
FIG. 2 is a simplified diagrammatic view of the guide according to FIG. 1 seen from above at an oblique angle.

The diagrammatic representations in FIGS. 1 and 2 show grooves 22; 32 in principal only in the form of thin-walled channels with a flat bottom wall 24, 34 and outwardly angled side walls, flanks or flanges 26, 28; 36, 38. In these cases, the groove can be made of, for example, folded and possibly welded steel plate that can be attached to the associated parts 12, 14 respectively by means of screw fittings. However, it is also possible to make the grooves or channels of plastic material.

Figure 5:
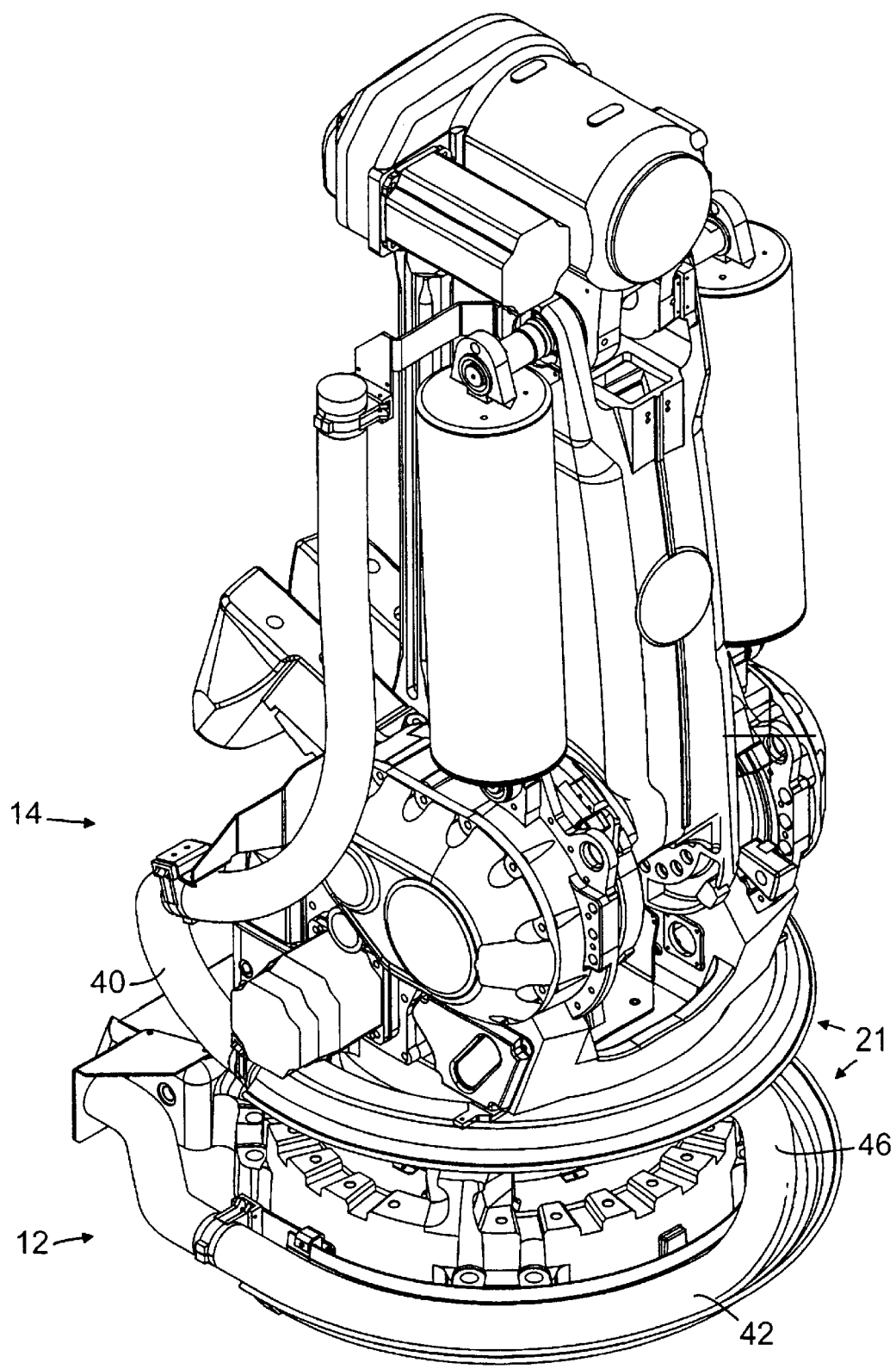
FIG. 5 is a view seen from the front and from above at an oblique angle of a foot and the frame element of an industrial robot equipped with a groove element according FIG. 3.

The cross-section of the groove can be varied to achieve an optimal compromise between minimal wear and best guidance, especially between the transition of the line between the strand and the bend in the groove with the smallest radius R2. According to one preferred embodiment of the invention shown in FIGS. 3 and 5, such an optimised groove is formed in groove element 21 from extruded and bent light metal, preferably aluminium.

Figure 3:
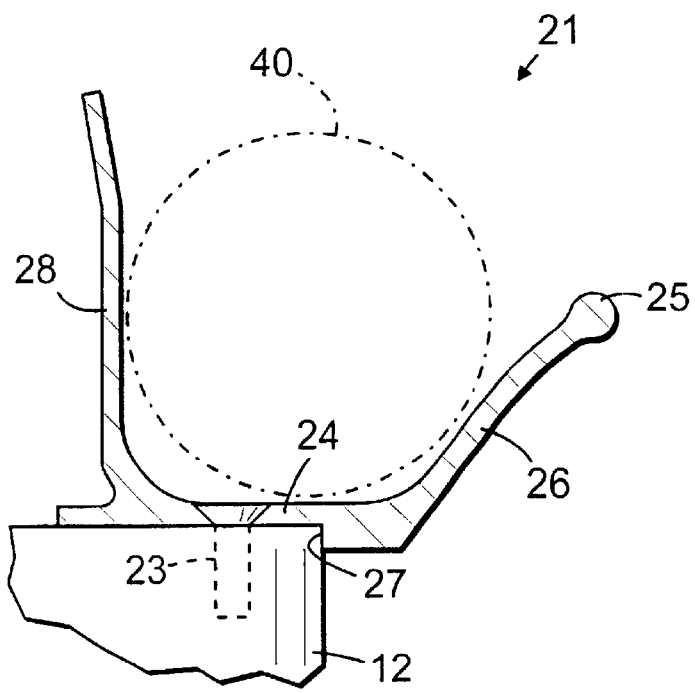
FIG. 3 is a view partly in cross-section and with parts removed of one preferred embodiment of a groove element according to the invention.

In the embodiment shown in FIG. 3, each groove is delimited by an essentially vertical inner flange 28 and an outer flange 26 that is angled outwards from the bottom wall 24. The inner sides of flanges 26, 28 are slightly convex to securely fix the cross-section of line 40 and guide line 40 down towards the bottom of the groove. However, as has already been mentioned, this also facilitates fitting or removing line 40 due to the free space between the grooves. In addition, the free ends of the outer flange 26 have a wider section that provides extra rigidity, that forms a gently rounded finish to reduce the risk of personal injuries, and that forms an end stop that can help prevent line 40 from jumping out from the groove if for some reason—such as due to a foreign object in the groove—it momentarily comes under pressure to be pushed out from the groove.

Each groove element 21 (FIG. 3) is attached to the associated part 12 of robot 10 from the outside of the robot by means of, for example, a screw fitting and is suitably positioned at the peripheral edge of associated part 12 via a peripheral corner recess 27 formed on the outside of the bottom 24 of the groove.

The angle of opening and the width between the flanks of the groove can also be formed so that the cross-section of the line snaps firmly into the groove. The downwards facing groove especially can be formed in this way to prevent the line falling out from the groove due to its weight.

Since an operator or service technician will for various reasons from time to time need to climb up onto the robot and can then need to use the groove elements as foot supports, these are suitably dimensioned to have the size and durability to match this need.

So that the upwards facing groove of the guide will not collect liquids and foreign objects, such as welding sparks and similar, this groove preferably has openings running through it. The openings can, in a way not shown, be accommodated in the bottom and in the flanges of the already described embodiments made of steel plate and light metal.

Figure 4:
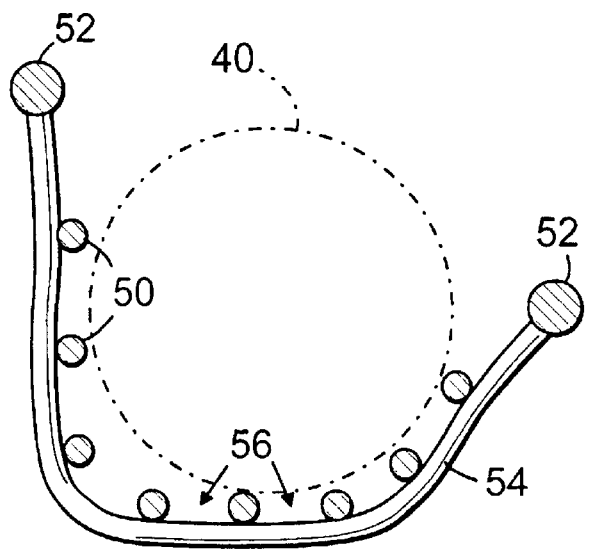
FIG. 4 is a cross-sectional view of an alternative embodiment of a groove element according to the invention.

In the embodiment shown in FIG. 4, the groove element is made of a welded steel wire construction. In this case, the groove is formed from essentially a half-circular arch-shape of steel wires 50, 52 that are carried on steel wires 54 (only one is shown) that are at right angles to these and that are evenly spaced peripherally, and that are shaped to the desired profile of the groove. As a consequence, the desired openings in the groove are formed by the gaps 56 between the steel wires.

The groove elements can, however, be formed in other ways. For example, they can be formed by straight sections that are welded together (not shown). The groove need not be continuous either, but can extend around the groove periphery in the form of discrete elements with the gap between them (not shown) forming the openings.

Figure 6:
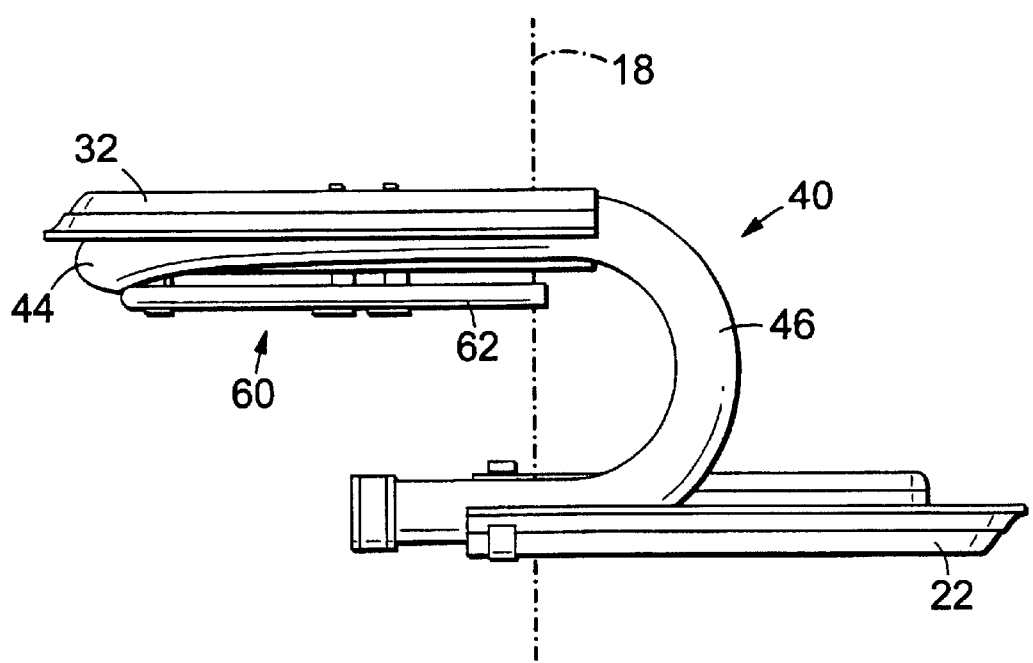
FIG. 6 is a side view of a guide according to the invention provided with a support for an upper part of the guided line.

FIG. 6 shows another embodiment of a guide according to the invention in the position at the end of its rotation (180° clockwise rotation) where the major portion of line 40 is in the upper strand 44. To avoid the risk that this might fall down from the upper groove 32, a lower support 60 is arranged for line 40. In the preferred embodiment, lower support 60 has the form of a hanging support comprised of a bent tube 62. Tube 62 extends concentrically to the upper groove 32 in such a way that it captures and holds the upper strand 44 from below when this tends to exit the groove due to its weight. Tube 62 suitably has a smaller radius than the radius of upper groove 32. If lower groove 22 additionally has a larger radius that upper groove 32, as is preferable, the bend of line 40 is angled inwards towards the upper groove without the risk of coming in contact with tube 62.

What is claimed is:

1. Guide for a loop of a flexible continuous line between a pair of rotatable parts of an industrial robot that rotate relative to one another around an axis, whereby the loop includes a pair of strands of the line joined by a bend that extend around the axis, said guide comprising:

means engaging outer sides of each of the strands with a respective part so that the loop is caused to perform a movement around the axis when the parts rotate relative to one another, wherein said engaging means comprises a pair of spaced and separate rigid annular grooves facing each other, a first of said pair of grooves engaging a first of the pair of strands, and a second of said pair of grooves engaging a second of the pair of strands, and wherein the grooves extend with mutually different distances from the axis.

2. The guide according to claim 1, wherein the grooves comprise an upper groove and a lower groove where the lower groove extends at a greater distance from the axis that the upper groove.

3. The guide according to claim 2, wherein there is an underlying support for the upper strand of the line where the underlying support extends concentrically along and below the upper groove.

4. The guide according to claim 1, wherein the grooves comprise an upper groove and a lower groove where the upper groove extends at a greater distance from the axis that the lower groove.

5. The guide according to claim 1, wherein the grooves extend in a common radial plane relative to the axis.

6. The guide according to claim 1, wherein at least one of the grooves includes a groove element that can be attached to and removes from the outer surface of the respective part.

7. The guide according to claim 6, wherein the groove element includes an extruded and bent light metal element.

8. The guide according to claim 6, wherein a bottom side of the, groove element has a peripheral recess arranged to position the groove element at a peripheral edge of the respective part.

9. The guide according to claim 1, wherein at least one of the grooves extends with substantially flat outwardly facing flanges from a substantially flat bottom of the groove.

10. The guide according to claim 1, wherein at least one upwardly facing groove of said grooves has openings running through said upwardly facing groove.

11. The guide according to claim 1, wherein at least one of the grooves is formed from a welded wire construction.

12. Guide for a loop of a flexible continuous line between a pair of rotatable parts of an industrial robot that rotate relative to one another around an axis, whereby the loop includes a pair of strands of the line joined by a bend that extend around the axis, said guide comprising:

means engaging outer sides of each of the strands with a respective part so that the loop is caused to perform a movement around the axis when the parts rotate relative to one another, wherein said engaging means comprises a pair of spaced and separate rigid annular grooves facing each other, a first of said pair of grooves engaging a first of the pair of strands, and a second of said pair of grooves engaging a second of the pair of strands and wherein at least one of the grooves extends about 180° around the robot.

13. Guide for a loop of a flexible continuous line between a pair of rotatable parts of an industrial robot that rotate relative to one another around an axis, whereby the loop includes a pair of strands of the line joined by a bend that extend around the axis, said guide comprising:

means engaging outer sides of each of the strands with a respective part so that the loop is caused to perform a movement around the axis when the parts rotate relative to one another, wherein said engaging means comprises a pair of spaced and separate rigid annular grooves facing each other, a first of said pair of grooves engaging a first of the pair of strands, and a second of said pair of grooves engaging a second of the pair of strands, and wherein at least one of the grooves has convex flanks.

* * * * *